Jan. 12, 1943.　　G. N. MUSICK ET AL　　2,307,851
HYDRAULIC DEVICE FOR VARIABLE SPEED TRANSMISSIONS
Filed June 1, 1939　　2 Sheets-Sheet 2
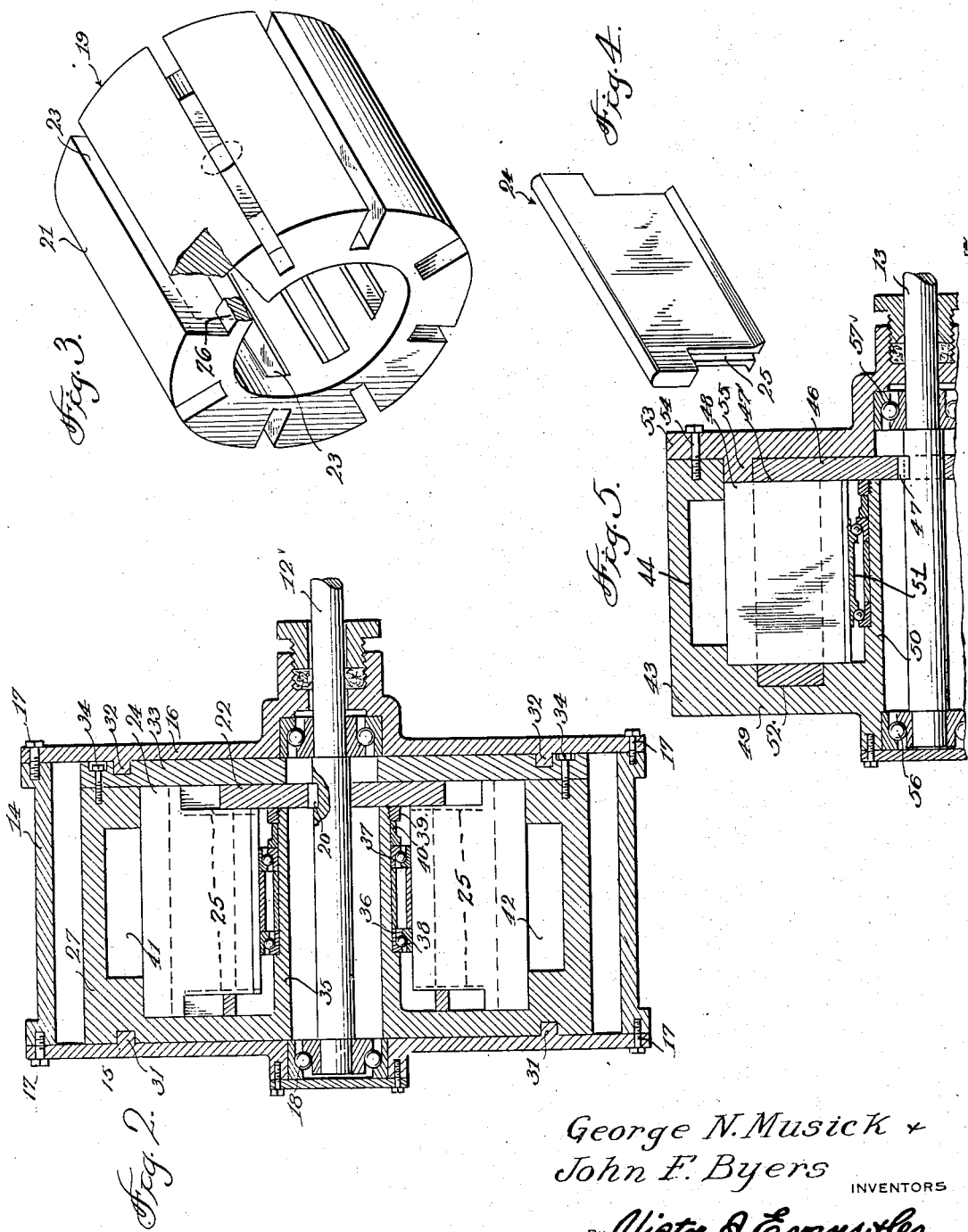
George N. Musick &
John F. Byers
INVENTORS
BY Victor J. Evans & Co.
ATTORNEYS Patented Jan. 12, 1943

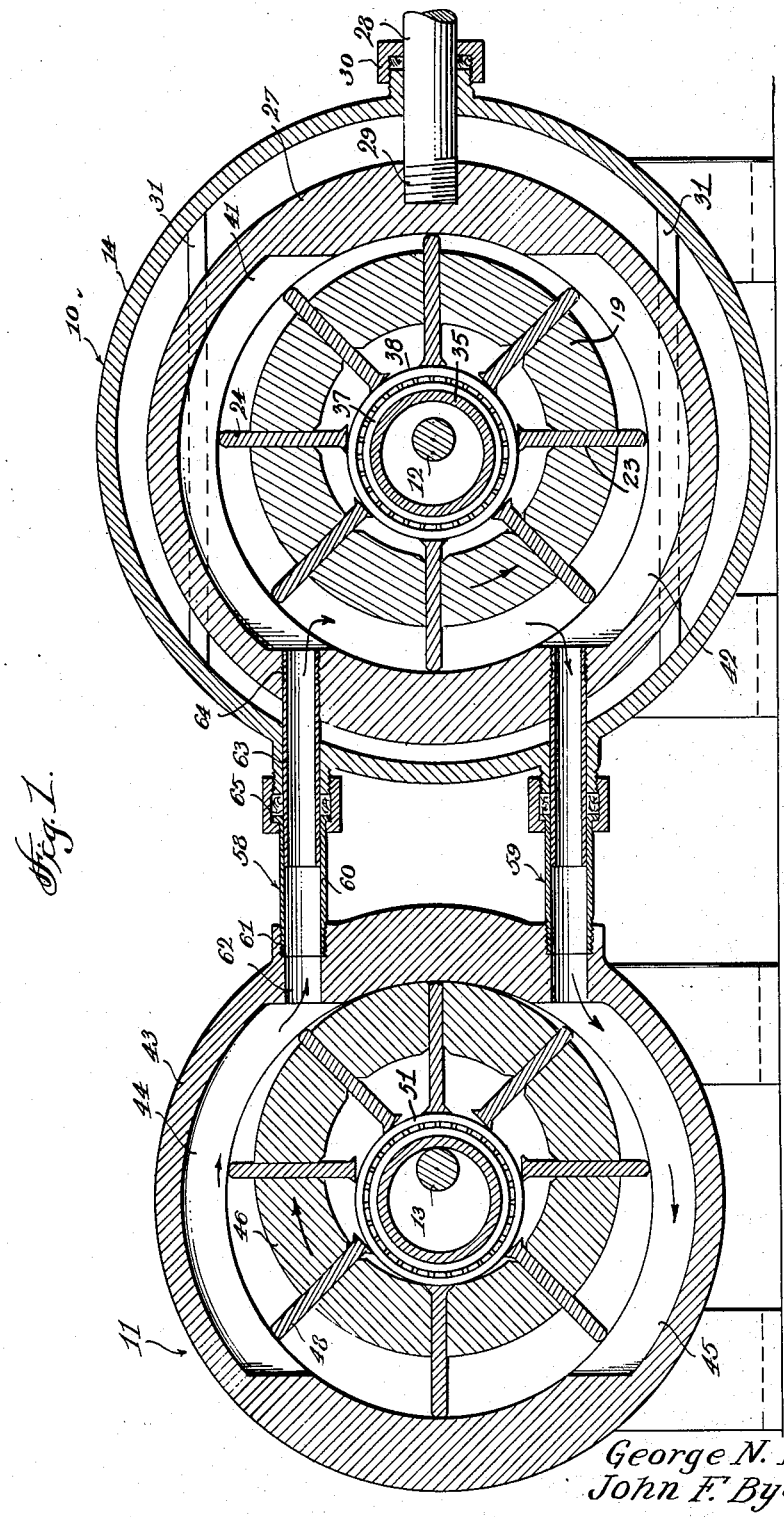

2,307,851

UNITED STATES PATENT OFFICE 2,307,851

HYDRAULIC DEVICE FOR VARIABLE SPEED TRANSMISSIONS

George N. Musick, Huntington, and John F. Byers, Owens, W. Va.

Application June 1, 1939, Serial No. 276,930

1 Claim. (Cl. 103—120)

The present invention relates to a new and improved hydraulic variable speed transmission.

An important object of the invention resides in the provision of a construction that has been designed for a multiplicity of uses and is intended to be used wherever variable speed, or constant speed, transmissions are used or desired.

Another object of the invention resides in the provision of a hydraulic variable speed transmission operating on a rotary principle and primarily consisting of two elements, a volumetric variable pump, and constant volume motor.

A further object of the invention resides in the provision of means within the variable pump for producing a variable rate of speed on the motor and for adjusting at will the position of the speed varying means.

A still further object of the invention resides in the provision of a pump unit in a hydraulic speed transmission containing a reversible feature for the purpose of reversing the direction of rotation of the motor with which the pump is associated.

One of the novel features of both units of the present invention is the guide ring which ring is mounted on ball or roller bearings and revolves with the vanes of the units. The riding of the vanes on the guide ring causes it to revolve and thus the contact between the guide ring and the vanes is of a rolling or rocking nature which tends to eliminate friction thus resulting in long life of and minimum wear of these parts.

The invention will be fully and comprehensively understood from a consideration of the following detailed description when read in connection with the accompanying drawings which form a part of the application.

In the drawings:

Figure 1 is a longitudinal sectional view through the device.

Figure 2 is a vertical sectional view of the pump or driving unit.

Figure 3 is a perspective view of the rotor employed in the pump or driving unit.

Figure 4 is a perspective view of one of the vanes, and

Figure 5 is a fragmentary vertical sectional view of the motor or driven unit.

Referring to the drawings for a more detailed description thereof, there is disclosed a driving unit 10 and driven unit 11 which units constitute the principal elements of the hydraulic variable speed transmission in accordance with the present invention. The driving unit functions as a pump while the driven unit functions as a motor, each unit operating on their respective shafts 12 and 13.

The driving unit 10 hereinafter termed a pump, comprises a substantially cylindrical shaped casing 14 having front and rear walls 15 and 16, respectively, bolted or otherwise secured to said casing as indicated at 17. The shaft 12 drives the pump and receives its power from any desired source, said shaft being concentrically mounted relative to the casing 14 and is appropriately journalled in bearings 18 carried by said casing.

The pump or driving unit further comprises a rotor 19 keyed to the shaft 12 as indicated at 20 for rotation therewith. The rotor 19 is formed with a cylindrical wall 21 and circular wall 22, one end of the rotor being open as more clearly shown in Figure 3 of the drawings, the end wall 22 representing that portion of the rotor which is keyed to the shaft 12. The wall 21 of the rotor 19 is provided with a multiplicity of equally spaced slots 23 in which are placed the vanes generally designated by the numeral 24, said vanes being substantially T-shaped with slots or grooves 25 in their lower side sections which slots serve as a communicating duct between the cavities in the rotor slots, to prevent the creation of a vacuum or the trapping of fluid in the rotor. The slots 23 extend the entire length of the rotor at the outer ends and extend from the outer surface inwardly except for a shoulder portion 26 at each end, as particularly shown in Figures 2 and 3.

As is to be understood, a fluid such as oil is circulated between the pump and motor, the action of the fluid driving the motor and being forced thereto by means of the rotor and vanes. A means has been provided, however, for varying and controlling the extent of flow of the fluid, said means comprising a shift ring 27 mounted within the casing 14 and between the same and the rotor 19. For correct operation of the device, the shift ring 27 should be in an eccentric position relative to the casing 14. However, said ring is readily shiftable from the eccentric position shown in Figure 1 of the drawings to a position concentric with the casing, which would be a neutral position and no rotation of the motor would be produced. The ring 27 may also be shifted to an eccentric position opposite the position shown in Figure 1 of the drawings, at which time the direction of liquid flow to the motor will be reversed, thus reversing the rotation of the motor. The ring 27 is shifted by means of a rod 28, the movement of which may be controlled by a lever, screw or governor or other desired means, as individual applications would require. The rod 28 is readily attached at 29 to the ring 27 being provided with a packing gland 30.

The front and rear walls 15 and 16, respectively, of the casing 14 are formed with inwardly extending rib portions 31 and 32, respectively, the rib portions 31 fitting within corresponding grooves formed in the front face of the ring 27 for guiding the same. A plate 33 is attached to the open side of the ring 27, the same being formed with grooves for receiving the ribs 32, said plate being attached to the ring by means of countersunk screws 34. The plate 33 aids in relieving pressure on the side of the casing from within the shift ring and to obtain a more accurate assembly of the parts within the shift ring.

One side of the shift ring 27 has an integrally formed collar portion 35 which extends inwardly over the shaft 12, and has abutting relation with the wall 22 of the rotor. The collar 35 is reduced in diameter substantially centrally thereof for receiving the ball or roller bearings 36, the same comprising an inner or stationary race 37 and outer or movable race 38, the outer race revolving with the vanes 24 having contact with the same. The riding of the vanes on the outer race which serves as a guide ring, causes it to revolve, thus the contact between the guide ring and the vanes is of a rolling or rocking nature, tending to eliminate friction and resulting in long life of and minimum wear on these parts. A lock nut and collar 39 and 40, respectively, retain the bearings in position on the collar. The ends of the vanes are of such a shape that they are held to a close running clearance on the inside of the shift ring by reason of their riding on the bearings or guide ring 38.

At diametrically opposite points of the shift ring 27, the same is formed with a depression or cavity 41 and 42, respectively, and as shown in Figure 2 of the drawings, the cavities do not extend the full width of the vanes but enough material has been left on each side of the ring 27 to serve as a guide for the vanes. Fluid is delivered to the motor from the lower cavity 42 and is returned to the pump from the motor through the upper cavity 41 during the operation of the device.

The construction of the motor or driven unit 11 is somewhat similar to that of the pump unit 10. However, since the motor is of constant volume, no shift ring or any other means of regulating the fluid volume within it are needed or desired. This feature permits a design which will provide greater strength and durability of parts and better sustained efficiency for longer periods of time. The motor unit 11 comprises a casing 43, the shaft 13 being concentrically mounted relative thereto. Upper and lower cavities 44 and 45, respectively, are formed in the casing 43 corresponding to the cavities 41 and 42 formed in the shift ring 27. A rotor 46 is keyed to the shaft 13 as indicated at 47, said rotor being also provided with slots in which are disposed vanes 48. The vanes 48 differ in shape from the vanes 24 used in the pump unit in that they are of a bar shape having equal dimensions from one end to the other. Furthermore no slots or grooves are required in the side sections of this type of vane because no cavity is created in the rotor as a result of the movement of the vane in the rotor slot. In other words, the size of the slot 47' in the rotor 46 is sufficient to accommodate the vanes 48 with the end portions of the rotor being substantially solid. One end wall 49 of the casing 43 has an integrally formed collar 50 extending inwardly in abutting relation with the rear wall of the rotor, the collar 50 forming a support for a bearing or guide ring 51 identical with the guide ring employed in the pump unit. The vanes 48 ride on the bearing or guide ring 51 causing it to revolve with the vane.

Referring more particularly to Figure 5 of the drawings, it will be noted that the wall 49 of the casing 43 is notched out as indicated at 52 for accommodating the rotor 46 and that the opposite wall 53 is bolted or otherwise secured to the casing as indicated at 54. The wall 53 is formed with a projecting portion 55 having frictional contact with the rotor 46.

The shaft 13 is suitably journalled in bearings 56 and 57 carried by the casing so as to be freely driven by the rotor 46.

The pump unit 10 has communication with the motor unit 11 through the system of pipes 58 and 59, respectively. The system 58 comprises a section of pipe 60 threadedly secured at 61 with a port 62 formed in the casing 43 which port has communication with the cavity 44. The section of pipe 63 is slidable within the pipe 60, one end thereof extending through and attached to the shift ring 27, as indicated at 64, said pipe having communication with the cavity 41. The pipes are suitably connected by a packing and coupling 65. The cavities 45 and 42 are united by the system of pipes 59 which is identical to the system 58 just described. It is to be understood that the pipes carried by the ring 27 move longitudinally with the shifting of the ring.

In the use of the device, let it be assumed that the ring 27 is concentric with the casing 14, which is a neutral position and no rotation of the motor will be produced. A gradual shifting of the ring 27 from its neutral or concentric position to the eccentric position illustrated in Figure 1 of the drawings, after applying power to the drive shaft 12, effects rotation of the rotor 19 causing fluid to flow through the pipe 59 into the cavity 45. The fluid contacting the vanes 48 effects rotation of the rotor 46. The fluid being admitted follows through the cavity 45 to a point substantially opposite the entrance of the fluid. From this point and for approximately 50° rotation, the vanes 48 obstruct the path of fluid flow between the rotor 46 and the casing 43 and no fluid can flow unless there be movement or rotation of the rotor. As rotation is produced the fluid flows to the cavity 44 and since the rotor at the intake side of the motor is at close proximity to the casing, no fluid can flow downwardly and must therefore pass out through the port 62 and pipe 58 to be returned to the pump. Varying the eccentric position of the ring 27 will vary the flow of fluid to the motor and thereby control the speed of rotation of the same. With the shift ring in the position shown in Figure 1 of the drawings, substantially maximum speed of rotation of the motor is attained.

With the shifting of the ring 27 to an eccentric position opposite that shown in Figure 1 of the drawings, fluid will be admitted to the motor through the pipe 58 and returned to the pump through the pipe 59 which is the reverse of that shown. As is to be understood, the vanes of the rotors are moving in or out of the rotor slots during rotation thereof.

The hydraulic variable speed transmission in accordance with the present invention is intended for use wherever variable speed or constant speed transmissions are used or desired. Due to such a diversified field of applications, it is to be understood that various types of installations would be arranged as to the position of one unit with respect to the other. For example, if the pump and one motor are to be used in an automobile or similar vehicle to replace the transmission, it is believed that the pump would be installed in the position and place now occupied by the present friction type clutch and the motor would be mounted directly in line with, and as closely as possible to the pump to replace the present metallic gear transmission. In such an installation as this, the fluid pipes between the two units would be very short, in fact, consisting of mere cavities between the ports of the two units.

On the other hand, if it be desired to locate the pump at one point convenient to the driving source, and the motor on individual wheels or machines at nearby or distant points, then suitable pipes, either rigid or flexible as each individual application would require, would be used as communicating ducts between the pump and motor units.

It is also to be understood that more than one motor unit may be operated from the single pump unit, the operation of which would be identical with that hereinbefore described.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described, and, therefore, such changes and modifications may be made therein as do not affect the spirit of the invention nor exceed the scope thereof as expressed in the appended claim.

What is claimed is:

In transmission mechanism, a cylindrical casing, a rotary drive shaft extended concentrically through the casing, a hollow member having inner and outer concentric sections mounted within the casing, the said casing having end walls provided on the interior with a plurality of ribs disposed parallel with a diameter of the casing and the hollow member having annular end walls in the exterior of which are provided grooves slidably engaging the said ribs for movement of the hollow member within the casing, an annular rotor mounted within the exterior section of the hollow member keyed to and disposed concentrically of the shaft, the said rotor having a plurality of radial slots, a tubular guide member rotatably mounted about the inner section of the hollow member, a plurality of vanes slidably extended through the slots in the rotor having their inner ends bearing against the said tubular guide member and their outer ends protruding toward the outer section of the hollow member, the interior of the outer section of the hollow member having diametrically opposed depressions therein, and a pair of conduits extended through the casing and the outer section of the hollow member and opening into the said depressions in the hollow member.

GEORGE N. MUSICK.
JOHN F. BYERS.